J. W. ROBERTS.
TOOL FOR CONTRACTING OR EXPANDING DEMOUNTABLE RIMS.
APPLICATION FILED NOV. 3, 1921.
1,424,680.
Patented Aug. 1, 1922.
2 SHEETS—SHEET 2.
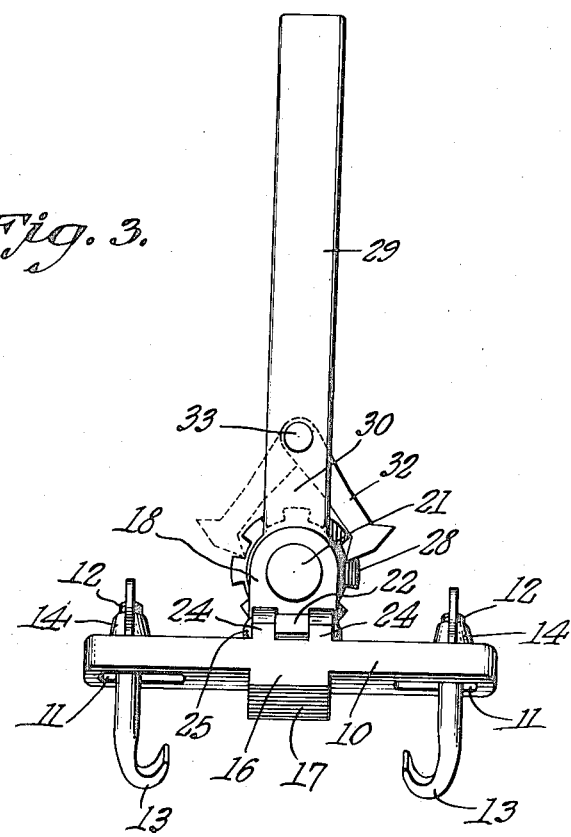
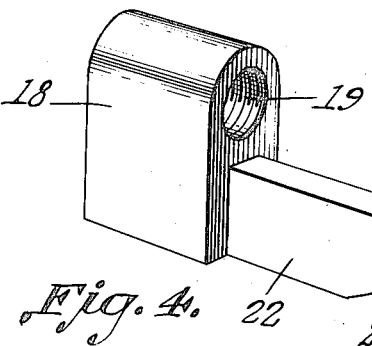
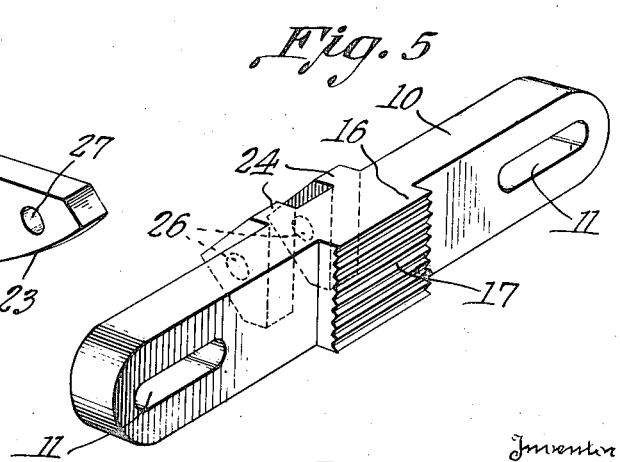
Inventor
J. W. Roberts
By Jerry A Mathews,
Attorney

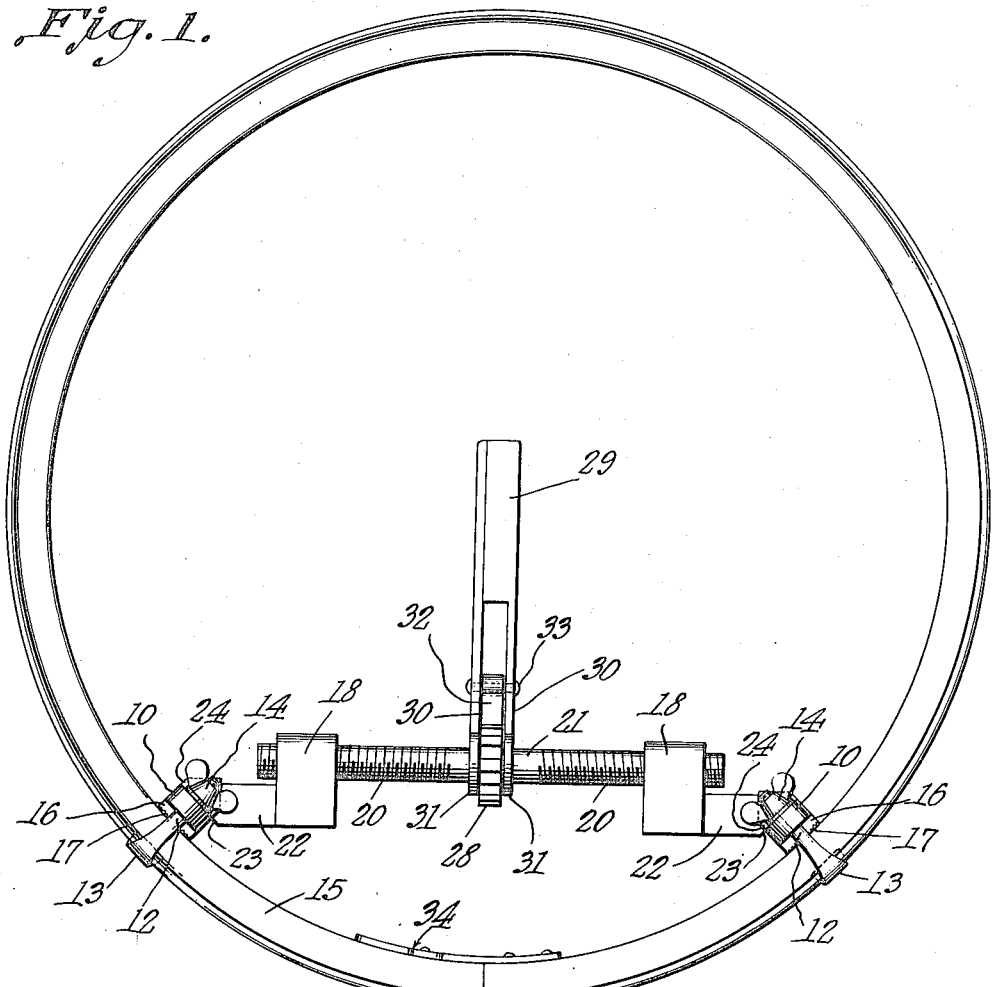
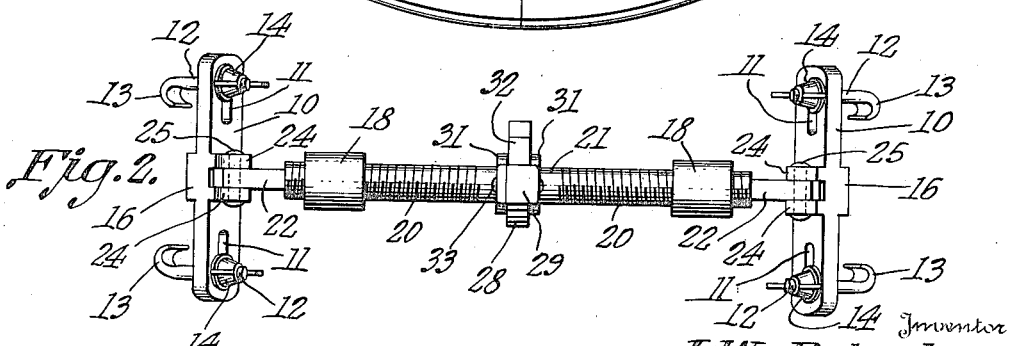

UNITED STATES PATENT OFFICE.

JOHN WESLEY ROBERTS, OF GRANTS PASS, OREGON.

TOOL FOR CONTRACTING OR EXPANDING DEMOUNTABLE RIMS.

1,424,680. Specification of Letters Patent. Patented Aug. 1, 1922.

Application filed November 3, 1921. Serial No. 512,593.

*To all whom it may concern:*

Be it known that I, JOHN WESLEY ROBERTS, a citizen of the United States, residing at Grants Pass, in the county of Josephine and State of Oregon, have invented certain new and useful Improvements in Tools for Contracting or Expanding Demountable Rims, of which the following is a specification.

My invention relates to a tool for contracting or expanding demountable rims of automobile wheels.

An important object of the invention is to provide a device of the above mentioned character, which is connected with the rim near its split end, and is adapted to suitably contract or expand the rim, without liability of permanently bending or springing the rim.

A further object of the invention is to provide a device for the above mentioned character, which is simple in construction, cheap to manufacture, and positive and reliable in operation.

A further object of the invention is to provide a device of the above mentioned character, which is adjustable for use in connection with rims of different sizes or widths.

Other objects and advantages of the invention will be apparent during the course of the following description.

In the accompanying drawings forming a part of this specification, and in which like numerals are employed to designate like parts throughout the same, Fig. 1 is a side elevation of a tool embodying my invention, showing the same in use, Fig. 2 is a plan view of the same, Fig. 3 is an end elevation of the tool, Fig. 4 is perspective of one of the sliding blocks, and, Fig. 5 is a similar view of one of the cross members or bars.

In the drawings, wherein for the purpose of illustration is shown a preferred embodiment of my invention, the numeral 10 designates cross members or bars, provided in their end portions with longitudinal slots 11, for receiving the shanks 12 of clamping hooks 13. The ends of the shanks 12 are screw threaded to receive winged nuts 14. It is obvious that the shanks 12 are adjustable within the slots 11 longitudinally of the transverse member or bar 10, and hence may be adjusted in accordance with the width of the split rim 15, with which they engage. The hooks 13 engage over the edges of the rim 15 and are brought into clamping engagement therewith by manipulation of the winged nuts 14. In order that the cross members or bars 10 may not slip circumferentially upon the rim 15, they are provided with blocks 16, upon their outer sides, which blocks are serrated or provided with teeth 17, as shown.

The numeral 18 designates sliding blocks, having screw threaded openings 19 to receive the screw threaded portions 20 of a turn-buckle rod 21. The screw threaded portions 20 are right and left screw threads, and the threads of the openings 19 receiving the screw threaded portions are right and left screw threads respectively, as is obvious. The blocks 18 slide or move longitudinally upon the turn-buckle rod 21, when this rod is turned, as is obvious. The sliding blocks 18 are provided at their outer ends with arms 22, preferably integral therewith. These arms have inclined faces 23. The ends of the arms 22 project between aperatured knuckles 24, preferably formed integral with the inner side of the cross members or bars 10, as shown. Pivot elements or bolts 25 pass through the apertures 26 in the ears and through an aperture 27 in the arm 22. The inclined face 23 permits the transverse member or bar 10 to swing inwardly, but limits its outward swinging movement.

The means to turn the turn-buckle rod 21 includes a ratchet wheel or toothed wheel 28, rigidly mounted upon the central portion of the rod 21, and a lever 29 has its forward end forked to provide spaced arms 30, having apertured heads 31, pivoted upon the rod 21, upon opposite sides of the wheel 28. A double ended dog 32 is pivoted between the arms 30, as shown at 33, and is adapted to be swung to reverse positions in engagement with the wheel 28, whereby the lever 29 may turn the rod 21 in either direction.

In the use of the tool, the transverse members or bars 10 are arranged near the ends of the split rims 15, and are clamped thereto by adjusting the nuts 14. The serrated or toothed blocks 17 prevent any slipping of the transverse members 10 upon the rim. By swinging the lever 29 back and forth, the rod 21 is turned in the desired direction, and after the latch 34 of the rim is opened, one end of the rim may be offset inwardly of the other end and further operation of the tool will serve to properly contract the rim. As the transverse members 10 are connected with the rim near its ends, the greater portion of the rim is left free to be subjected to a gradual bending operation, and hence there is no tendency for the rim to become permanently bent or sprung, as is frequently the case where the contracting force is applied to a relatively small portion of the rim.

It is to be understood that the form of my invention herewith shown and described, is to be taken as a preferred example of the same, and that various changes in the shape, size, and arrangement of parts may be resorted to without departing from the spirit of my invention or the scope of the subjoined claim.

Having thus described my invention, I claim:

In a device of the character described, a pair of transverse bars provided upon their outer faces with serrated blocks integral therewith, said blocks being spaced from the ends of said bars, said bars having pairs of spaced knuckles upon the inner sides thereof adjacent to and opposite said blocks, said bars having elongated slots in their ends, clamping elements adjustably mounted in the slots, blocks having screw threaded openings and provided with arms adapted for insertion between said knuckles, said arms being adapted to engage at their ends with said bars, said arms being cut away near their ends at corresponding sides whereby the bars may swing inwardly in one direction with relation to said rims, pivoted elements connecting the knuckles and arms and a turn-buckle rod operating within the screw threaded openings to turn the turn-buckle rod.

In testimony whereof I affix my signature.

JOHN WESLEY ROBERTS.